United States Patent Office 2,895,969
Patented July 21, 1959

2,895,969

CYCLOPENTANOPHENANTHRENE DERIVATIVES

Howard J. Ringold, Fred Allan Kincl, and Enrique Batres, Mexico City, Mexico, assignors to Syntex S.A., Mexico City, Mexico, a corporation of Mexico No Drawing. Application September 22, 1958
Serial No. 762,269

Claims priority, application Mexico September 23, 1957

9 Claims. (Cl. 260—397.3)

The present invention relates to novel cyclopentanophenanthrene derivatives.

More particularly the present invention relates to $\Delta^{1,4}$, $\Delta^{4,6}$ and $\Delta^{1,4,6}$ derivatives of progesterone chlorinated or brominated at C–4. The novel compounds of the present invention are more completely described as 4-chloro-$\Delta^{1,4}$-pregnadien - 3,20 - dione, 4-bromo-$\Delta^{1,4}$-pregnadien-3,20-dione, 4-chloro-$\Delta^{4,6}$-pregnadien-3,20-dione, 4-bromo-$\Delta^{4,6}$-pregnadien-3,20-dione, 4 - chloro-$\Delta^{1,4,6}$-pregnatrien-3,20-dione and 4-bromo-$\Delta^{1,4,6}$-pregnatrien-3,20-dione. The novel compounds of the present invention just described are progestational hormones. In addition they exhibit a strong anti-leukemic effect i.e. causing lysis of leukemic cells in vitro. Further since they may be conventional means be provided with a 21-hydroxy group and a 17$\alpha$-hydroxy group they are valuable intermediates for the corresponding 4-chloro and 4-bromo derivatives of 1- dehydro "S", 6-dehydro "S" and 1,6-bis-dehydro "S" which upon addition of an 11$\beta$-hydroxy by conventional adrenal tissue incubation are converted to the corresponding active corticoids or corresponding "F" derivatives.

In accordance with the present invention the aforementioned novel compounds are prepared by dehydrogenating the corresponding 4-chloro or 4-bromo-progesterone. If the starting material is dehydrogenated with chloranil in n-amyl alcohol the corresponding $\Delta^{1,4,6}$-derivaties were obtained, if the dehydrogenation reagent is chloranil in xylene the $\Delta^{4,6}$-derivatives were obtained and if the dehydrogenation is with selenium dioxide the $\Delta^{1,4}$-derivatives were obtained.

The novel compounds of the present invention are illustrated by the following formulas:

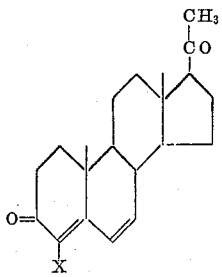

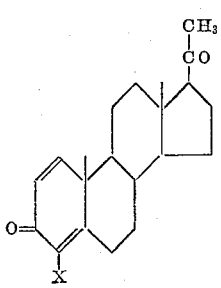

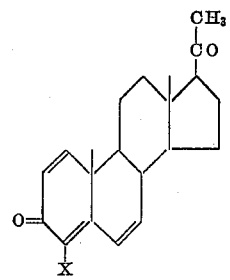

In the above formulas X represents chlorine or bromine.

The above compounds are prepared by a process illustrated by the following equation:

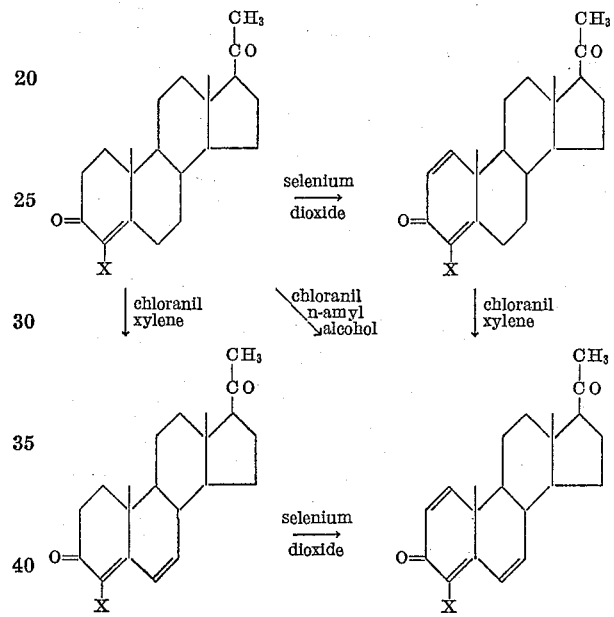

In the above equation X represents chlorine or bromine.

In practicing the above process the starting materials namely 4-chloro-progesterone or 4-bromo-progesterone were obtained by treating progesterone with hydrogen peroxide in the presence of a base to produce 4$\beta$,5$\beta$-oxido-pregnan-3,20-dione which was treated with hydrochloric acid to form 4-chloro-progesterone or with hydrobromic acid to form 4-bromo-progesterone.

Treatment of the 4-chloro or bromo-progesterone with chloranil in n-amyl alcohol gave in one step the corresponding 4-chloro or bromo-$\Delta^{1,4,6}$-pregnatrien-3,20-dione. As indicated in the above equation dehydration with selenium dioxide preferably in the presence of t-butanol gave 4-bromo or chloro-$\Delta^{1,4}$-pregnadien-3,20 - dione. Further treatment of these last mentioned dienes with chloranil in xylene gave the same $\Delta^{1,4,6}$-trienes previously set forth. Similarly treatment of 4-chloro or bromo-progesterone with chloranil in xylene gave the corresponding 4-bromo or chloro-$\Delta^{4,6}$-pregnadien-3,20-dione and further treatment of these dienes with selenium dioxide gave the same 4-chloro or bromo-$\Delta^{1,4,6}$-pregnatrien, 3,20-dione compounds as the one step treatment with chloranil in n-amyl alcohol.

The following specific examples serve to illustrate but are not intended to limit the present invention.

*Example I*

10 g. of progesterone dissolved in 300 cc. of methanol was treated with 20 cc. of 10% aqueous sodium hydroxide solution, cooled to 0° C. and treated dropwise with 60 cc. of 35% hydrogen peroxide previously cooled to 0° C., while the temperature of the mixture was kept below 5° C. The mixture was allowed to react for 4 hours at 0° C. and then it was poured into water and ice and extracted with methylene dichloride; the extract was washed with water to neutral, dried and completely evaporated, thus leaving a crystalline mass which was chromatographed with 300 g. of alkaline alumina; elution with benzene-ether afforded 4β,5β-oxido-pregnan-3,20-dione which was recrystallized from methanol.

8 g. of the above epoxide was dissolved in 120 cc. of acetone and treated at room temperature with 8 cc. of concentrated hydrochloric acid; after 45 minutes it was poured into water, cooled and the precipitate was filtered and dried on the steam bath. There was thus obtained 4-chloro-progesterone which upon crystallization from acetone yielded the pure substance.

*Example II*

When in the process of Example I, the epoxide was opened with boiling hydrobromic acid solution instead of hydrochloric acid there was obtained 4-bromo-progesterone.

*Example III*

A mixture of 5 g. of 4-chloro-progesterone, 7 g. of chloranil and 100 cc. of anhydrous n-amyl alcohol was refluxed for 16 hours, cooled and diluted with 500 cc. of ether; the solution was washed with water, dried over anhydrous sodium sulfate, filtered and evaporated to dryness, finally under reduced pressure, and the residue was purified by chromatography. There was thus obtained 4-chloro-$\Delta^{1,4,6}$-pregnatrien-3,20-dione.

*Example IV*

A mixture of 5 g. of 4-chloro-progesterone, 200 cc. of anhydrous t-butanol, 1.5 g. of selenium dioxide and 0.5 cc. of pyridine was refluxed for 70 hours under an atmosphere of nitrogen, cooled, diluted with 200 cc. of ethyl acetate and filtered through celite, washing the filter with 50 cc. of ethyl acetate; the filtrate and washings were combined and evaporated to dryness under reduced pressure. The residue was triturated with water and the crystalline precipitate was collected by filtration, washed and dried, thus yielding the crude 4-chloro-$\Delta^{1,4}$-pregnadiene-3,20-dione. The analytical sample was obtained by chromatography.

4 g. of the above 4-chloro-$\Delta^{1,4}$-pregnadien-3,20-dione was mixed with 3 g. of chloranil and 80 cc. of xylene and refluxed for 12 hours; the cooled mixture was diluted with 200 cc. of ether and washed with water, dried over anhydrous sodium sulfate, filtered and evaporated to dryness. Chromatography of the residue afforded 4-chloro-$\Delta^{1,4,6}$-pregnatrien-3,20-dione, identical with the final compound obtained by the method of Example III.

*Example V*

4 g. of 4-chloro-progesterone was refluxed with 3 g. of chloranil and 80 cc. of zylene for 12 hours; the cooled mixture was diluted with 300 cc. of ether, washed with water, dried over anhydrous sodium sulfate, filtered and evaporated to dryness. The residue consisted of the crude 4-chloro-$\Delta^{4,6}$-pregnadien-3,20-dione. The analytical sample was obtained by chromatography.

3 g. of the crude 4-chloro-$\Delta^{4,6}$-pregnadien-3,20-dione was mixed with 1 g. of selenium dioxide, 200 cc. of anhydrous t-butanol and 0.3 cc. of pyridine and the mixture was refluxed for 70 hours under an atmosphere of nitrogen. After cooling, it was diluted with 200 cc. of ethyl acetate, filtered through celite, washing the filter with 50 cc. of ethyl acetate, and the combined filtrate and washings was evaporated to dryness under reduced pressure. Trituration of the residue with water afforded a crystalline precipitate consisting of the crude 4-chloro-$\Delta^{1,4,6}$-pregnatrien-3,20-dione. Chromatography yielded the pure compound, identical with the final product obtained by the method of Example III.

*Example VI*

By the same methods as those described in Examples III to V, 4-bromo-progesterone was converted into 4-bromo-$\Delta^{1,4,6}$-pregnatrien-3,20-dione, 4-bromo-$\Delta^{1,4}$-pregnadien-3,20-dione and 4-bromo-$\Delta^{4,6}$-pregnadien-3,20-dione.

We claim:

1. A compound of the following formula:

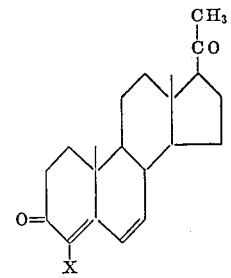

wherein X is selected from the group consisting of chlorine or bromine.

2. A compound of the following formula:

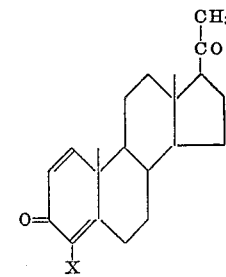

wherein X is selected from the group consisting of chlorine or bromine.

3. A compound of the following formula:

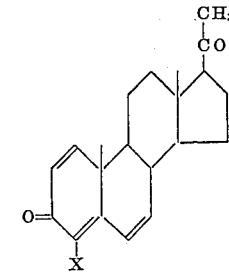

wherein X is selected from the group consisting of chlorine or bromine.

4. 4-chloro-$\Delta^{1,4}$-pregnadien-3,20-dione.
5. 4-bromo-$\Delta^{1,4}$-pregnadien-3,20-dione.
6. 4-chloro-$\Delta^{4,6}$-pregnadien-3,20-dione.
7. 4-bromo-$\Delta^{4,6}$-pregnadien-3,20-dione.
8. 4-chloro-$\Delta^{1,4,6}$-pregnatrien-3,20-dione.
9. 4-bromo-$\Delta^{1,4,6}$-pregnatrien-3,20-dione.

No references cited.